United States Patent

[11] 3,543,648

| [72] | Inventor | Kurt Stahle<br>Heimsheim, Leonberg, Germany |
|---|---|---|
| [21] | Appl. No. | 758,325 |
| [22] | Filed | Sept. 9, 1968 |
| [45] | Patented | Dec. 1, 1970 |
| [73] | Assignee | Jos. Schneider & Co.<br>Optische Werke, Bad Kreuznach,<br>Rhineland, Germany<br>a corporation of Germany |
| [32] | Priority | Sept. 8, 9167 |
| [33] | | Germany |
| [31] | | 1,650,559 |

[54] FLOW REGULATOR WITH REGENERATING EFFECT
8 Claims, 13 Drawing Figs.

[52] U.S. Cl. .................................................. 91/461;
137/625.62, 137/625.64
[51] Int. Cl. .................................................. F15b;
13/044
[50] Field of Search ........................................... 91/388
(Cursory), 52, 461; 137/625.62, 625.64 (Cursory)

[56] References Cited

UNITED STATES PATENTS

| 2,936,783 | 5/1960 | Nloffatt.......................... | 137/625.62 |
| 3,023,781 | 3/1962 | Larsen............................ | 91/52 |
| 3,260,273 | 7/1966 | Hayner........................... | 91/388 |
| 3,385,309 | 5/1968 | Bains.............................. | 137/625.62 |

*Primary Examiner*—Paul E. Maslousky
*Attorney*—Karl F. Ross

ABSTRACT: Servovalve, especially flow regulator, wherein a valve piston is axially slidable in response to a differential in fluid pressure prevailing in two pressure chambers at opposite ends of the piston, this differential being brought about by the selective displacement of a control tongue interposed between two closely spaced orifices through which pressure fluid is concurrently admitted to the two chambers. The pressure differential also exerts a regenerative feedback effect upon the controlling motion of the tongue.

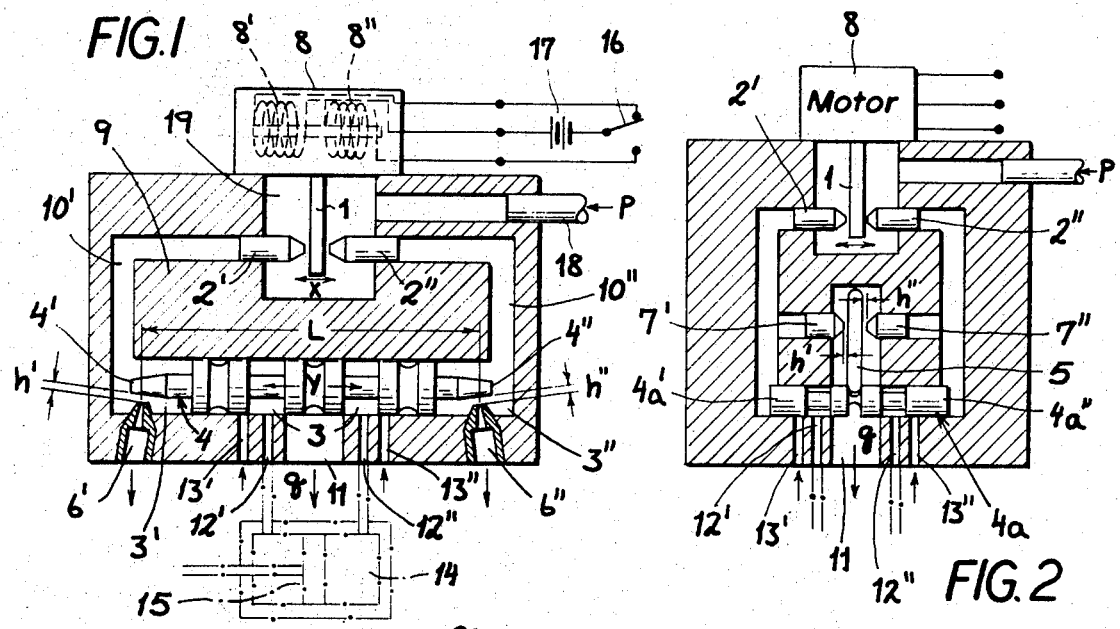

Kurt Stähle
INVENTOR

BY
Karl J. Ross
Attorney

Kurt Stähle
*INVENTOR.*

BY

Karl J. Ross
*Attorney*

FLOW REGULATOR WITH REGENERATING EFFECT

My present invention relates to a fluid-operated servosystem including a valve having a piston which, in response to a relatively small controlling force, executes an axial stroke for starting, stopping or reversing the flow of a controlled fluid or changing some other controlled variable.

In my copending U.S. Pat. application Ser. No. 612,276, filed Jan. 27, 1967 and now abandoned, I have described a servovalve of this kind wherein a piston responds to a pressure differential of a controlling fluid acting upon its opposite ends, this pressure differential being brought about by an electromagnetically or otherwise displaceable tongue partly obstructing a restricted outlet from a pressure chamber formed at one piston extremity while a corresponding chamber outlet at the opposite extremity is constantly vented to a region of low pressure.

As more particularly described in that copending application, the latter outlet is a channel inclined at a small angle to a radial plane of the piston so as to be substantially perpendicular to the proximal generatrix of a tapered extremity of the piston capable of more or less blocking this outlet in different axial positions; a particular advantage of this arrangement is the fact that a pressure drop at the outlet does not give rise to an axial force component which would tend to shift the piston.

An object of my present invention is to provide an improved servosystem of this general type which, by virtue of a symmetrical arrangement of its parts, is balanced in its operation with reference to a central position of the piston and the associated control element.

Another object is to provide a servosystem of this character whose response to a controlling signal is virtually independent of signal frequency.

In accordance with my present invention, the inlets of the two pressure chambers located at opposite ends of the valve piston confront each other across a narrow gap, the control element being interposed between these inlets for differentially restricting the access of pressure fluid to the two pressure chambers by moving within the gap toward one or the other inlet. The resulting shift of the piston causes a differential obstruction of the chamber outlets by suitable blocking means forming part of or entrained by the piston, thereby restoring the original pressure balance. The blocking means may be a pair of tapered extremities of the piston itself, cooperating with inclined outlets in the manner described above and claimed in my prior application, or may be designed as a separate member interposed between the two outlets which in that case also confront each other across a gap.

With this arrangement, an imbalance created by displacement of the control element from its normal position also develops a pressure differential across the control element itself in a sense aiding such displacement, thereby providing a regenerative feedback effect. The resulting intensification of the control movement increases the sensitivity of the system to an input signal and, as well be shown in detail hereinafter, can also be used to make the system virtually frequency-independent.

To prevent any instability arising from such positive feedback, another feature of my invention utilizes a supplemental negative feedback from an axial thrust exerted upon the piston by the flow of controlled fluid, the direction of this axial thrust coinciding with the sense of displacement of the piston by the established pressure differential. A particularly effective way of creating this thrust resides in the provision of a stationary deflector in a recess between two axially spaced lands of the piston whereby the controlled fluid impinges upon only one or the other edge of this recess, depending upon the direction of shift, these edges advantageously being flared to convert radial into axial flow.

The invention will be described in greater detail with reference to the accompanying drawing in which:

FIG. 1 is a cross-sectional view of a flow regulator embodying the invention;

FIG. 2 is a view similar to FIG. 1, showing a modified system;

FIG. 6 is a cross-sectional view of a piston and cylinder assembly generally similar to that of FIG. 5;

FIG. 7 is a cross-sectional view taken on the line VII-VII of FIG. 6;

FIG. 8 is a cross-sectional view taken on the line VIII-VIII of FIG. 5: and

Figure 3:
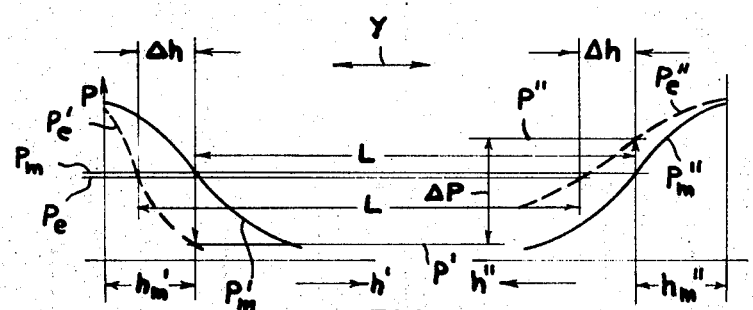
FIG. 3 is a graph serving to explain the operation of the system of FIG. 1 or 2.

FIGS. 9—13 are several block diagrams used for a more detailed analysis of my improved system.

In FIG. 1 I have shown a solid body 9 formed with a cylindrical bore 3 to accommodate a valve piston 4, this bore communicating with five ports 11, 12', 12'', 13', and 13'' which form part of a conduit system including a load operated by the piston 4; the load has been shown, by way of example, to comprise a cylinder 14 and a piston 15. The bore 3 defines two pressure chamber 3', 3'' adjacent opposite ends 4', 4'' of piston 4, these chamber being connected by way of respective conduits 10', 10'', to a pair of nozzle-shaped inlets 2', 2'' confronting each other across a narrow gap. Disposed within this gap for translational or pivotal movement toward either inlet 2', 2'', as indicated by arrow $x$, is a tongue-shaped control element 1 to which motion may be imparted by a motor 8 in response to an input signal from an actuator here shown diagrammatically as a switch 16. As illustrated in my prior application, the motor 8 may comprise a pair of solenoids 8', 8'', alternatively energizable by the switch 16 from a current source 17 illustrates as a battery. A source of control fluid (e.g. oil) under pressure, represented by an arrow P, is connected via a pipe 18 with a space 19 containing the tongue 1 and the inlets 2, 2'.

The ends 4', 4'' are of frustoconical configuration and are separated by small clearances $h'$, $h''$ from respective outlets 6', 6'' which are also in the form of generatrix passages, the direction of these passages being perpendicular to the nearest generatrix of the corresponding frustocone.

An axial shift (arrow $y$) of the piston 4 from its illustrated centered position will thus reduce one of these clearances while widening the other, thereby creating an imbalance which eventually compensates a pressure differential in chambers 3', 3'' giving rise to such shift.

The two outermost ports 13', 13'' serve for the admittance of a flow of controlled fluid $g$ (e.g. oil) which may be obtained from the same source as the controlling fluid in space 19 and which is discharged through the central port 11 to a sump, to the intake side of an oil pump or to some other low-pressure region which may also receive the fluid issuing from outlets 6', 6''.

Intermediate ports 12' and 12'' are connected to load cylinder 14 on opposite sides of working piston 15. Movement of valve piston 4 to the left, therefore, interconnects ports 12' and 13' as well as ports 11 and 12'' to drive the working piston to the right; conversely, rightward movement of valve piston 4 interconnects ports 12'' and 13'' as well as ports 11 and 12' for reverse displacement of working piston 15. The stroke $y$ of piston 4 is considerably greater than the stroke $x$ of control element 1 and depends, inter alia, on the taper of its extremities 4', 4''.

The system of FIG. 2 differs from that of FIG. 1 by the fact that the piston $4a$ thereof has blunt ends $4a'$, $4a''$ which do not cooperate with any outlets from the adjoining pressure chambers; instead these outlets 7', 7'' are disposed in parallel with inlets 2', 2'' and confront each other across a gap receiving a disk-shaped blocking member 5 mechanically connected with piston $4a$. The space accommodating the disk 5 and the outlets 7', 7'' forms an extension of discharge port 11.

The clearances $h'$ and $h''$ determining the extent of throttling of the outgoing fluid are defined in FIG. 2 by the separation of disk 5 from outlets 7', 7''. In this instance, contrary to the arrangement of FIG. 1, the stroke $y$ of the piston cannot be much greater than the range of displacement of tongue 1. In principle, however, the two systems operate in the same way, the application of an input signal to motor 8 serving to change the flow of controlled fluid $q$ through a load.

Reference will now be made to FIG. 3 for a description of the mode of operation of either of these systems. Along the abscissa of FIG. 3 I have plotted the two clearances $h'$, $h''$ which in turn are linear functions of the axial piston shift $y$; the ordinate represents the pressure P of the controlling fluid effective in either compression chamber 3', 3'' (FIG. 1).

The two virtually symmetrical curves $P_m'$, $P_m''$ (shown in full lines) indicate the relationship between fluid pressure and outlet clearance $h'$, $h''$ in the normal midposition of tongue 1; curves $P_e'$ and $P_e''$ (dot-dash lines) show the same functions after a leftward shift of tongue 1 which causes the pressure in chamber 3' to fall off more rapidly, as a result of the greater constriction of inlet 2', upon an increase in clearance $h'$ while conversely the pressure drop in chamber 3'' becomes more gradual. The length L represents the fixed distances between outlets 6', 6'' in FIG. 1 or 7', 7'' in FIG. 2.

In the normal position the same pressure $P_m$ prevails in chambers 3', 3'', the two outlet clearances $h_m'$, $h_m''$ having substantially the same magnitude. When, however, the tongue 1 (FIG. 1 or 2) is moved to the left, the equilibrium is restored through a leftward shift of the piston by a distance $\Delta h$ which establishes a pressure $P_e$ on both sides of the piston, the value of $P_e$ being nearly equal to that of $P_m$. This shift is brought about by a pressure differential $\Delta P = P'' - P'$ which developed in the original position as a result of the displacement of controller 1.

Figure 4:
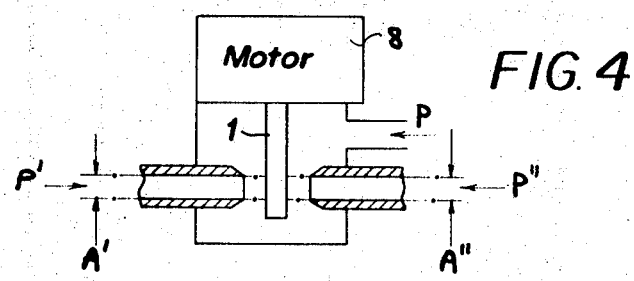
FIG. 4 is a diagrammatic view of part of the system of FIG. 1 or 2.

As shown in FIG. 4, the same pressure difference $P'' - P'$ acts upon the areas $A'$, $A''$ of tongue 1 in a sense tending to move the tongue further to the left; thus, the regenerative feedback effect of this pressure differential is proportional to the force $A\Delta P$ where A equals the two areas $A'$, $A''$.

Figure 9:
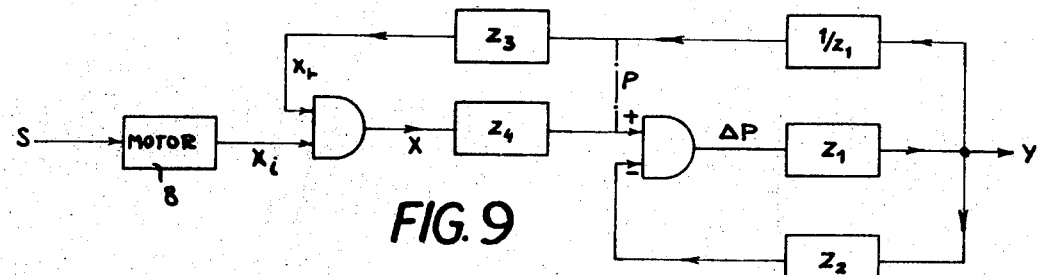

FIG. 9 is a block diagram in which boxes $Z_1$, $Z_2$, $Z_3$ and $Z_4$ represent various mechanical impedances or transmission factors effective in a servovalve according to the invention. Thus, $Z_1$ represents the response of piston 4 to a pressure differential in chamber 3', 3'', i.e. the magnitude of the displacement $y$ induced by a unit increment of $\Delta P$; $Z_2$ represents the rate of change of $\Delta P$ by reason of the variation in clearances $h'$, $h''$ due to such displacement $y$; $Z_3$ represents the feedback factor, i.e. the displacement $x$ of controller 1 due to the above-described force $A\Delta P$; and $Z_4$ is the effect of an incremental displacement $x$ upon the pressure differential $\Delta P$. $Z_2$, $Z_3$ and $Z_4$ may be considered substantially constant; however, is a function of the friction and inertia of piston 4 which gives rise to components depending on velocity and acceleration so that $Z_1$ can be expressed as a polynomial in terms of time, being thus a function of the actuating frequency.

The letter $s$ in FIG. 9 denotes an input signal applied to motor 8, the immediately resulting shift of tongue 1 being designated $x_i$. The additional displacement of this tongue by the aforedescribed regenerative feedback is indicated at $x_r$. The total displacement is given by $x$, the addition of $x_i$ and $x_r$ being symbolized by a conventional AND gate. Similarly, the two pressure components $Z_2$ and $Z_4$ are shown merged in an AND gate producing the differential $\Delta P$, the minus (−) sign indicating the negative effect of the change in output clearance.

A dot-dash line $p$ represents the actual way in which the pressure differential $\Delta P$ acts upon the stroke $x$ through feedback $Z_3$; for convenience in the subsequent arithmetical computation of the overall transmission factor, however, I have shown an equivalent connection from the output $y$ to the input of $Z_3$ which includes a virtual impedance $1/Z_1$ to balance the presence of $Z_1$ in the illustrated flow path from $Z_4$ to $Z_3$.

Figure 10:
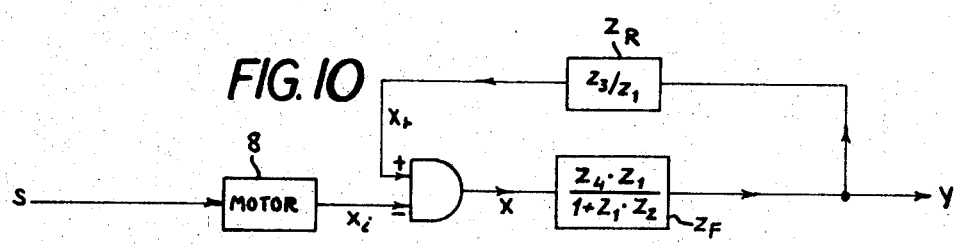

A simplified block diagram, shown in FIG. 10, lumps the impedance $Z_F$ and the impedances $Z_3$ and $1/Z_1$ in a single reverse inpedance $Z_R$. It can be readily shown that $$Z_F = \frac{Z_4 Z_1}{1 + Z_1 Z_2} \tag{1}$$

and $$Z_R = Z_3/Z_1 \tag{2}$$

whence $$y = (x_i + y Z_R) Z_F \tag{3}$$

which yields $$\frac{X_i}{y} = \frac{1 + Z_1 Z_2 - Z_3 Z_4}{Z_1 Z_4} \tag{4}$$

If the effective areas $A_1$, $A_2$, (FIG. 4) of the controller and other relevant system parameters, such as the size of the inlets 2' and 2'', are so dimensioned as to satisfy the condition $$K_3 K_4 = 1 \tag{5}$$

where $K_3$ and $K_4$ are the constant magnitudes of $Z_3$ and $Z_4$, respectively, the time-dependent variable $Z_1$ cancels out so that equation (4) reduces to $$\frac{x_1}{y} = \frac{K_2}{K_4} \tag{6}$$

($K_2$ being the constant magnitude of $Z_2$).

The system then operates substantially independently of frequency within a range in which the magnitudes $Z_2$, $Z_3$ and $Z_4$ do not vary significantly with the rate of oscillation of tongue 1.

The foregoing analysis ignores the reaction of the load upon the valve piston 4. A block diagram taking this reaction into consideration, in a system where the piston 4 controls the flow of hydraulic or pneumatic fluid $q$ as illustrated in FIG. 1, has been shown in FIG. 11. There, the mechanical impedances $Z_1$–$Z_4$ have been supplemented by two further impedances $Z_5$ and $Z_6$, $Z_5$ representing the conversion factor of piston stroke $y$ into flow rate $q$ while $Z_6$ determines the effect of this flow rate upon the pressure differential $\Delta P$. The solid line $P$ in FIG. 11 corresponds to the dot-dash line of FIG. 9. Also, the blocks $Z_1$—$Z_6$ have been provided with symbolic representations of the corresponding functions, all of which are shown to be constants except for the function $Z_1$.

Figure 11:
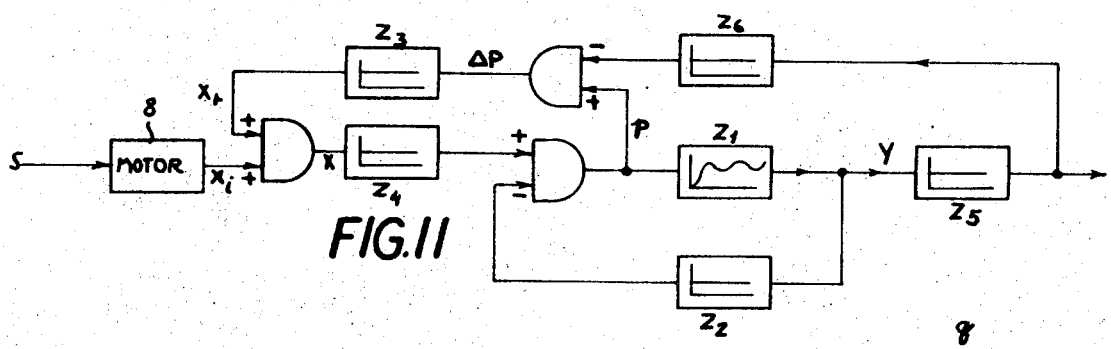

FIG. 11 includes a further AND gate adding the output of $Z_6$ to the pressure from line $p$ to produce the differential $\Delta P$. The minus (−) sign at the output of $Z_6$ indicates the negative effect of the load reaction upon the pressure differential, this degenerative feedback being desirable to stabilize the system.

Figure 12:
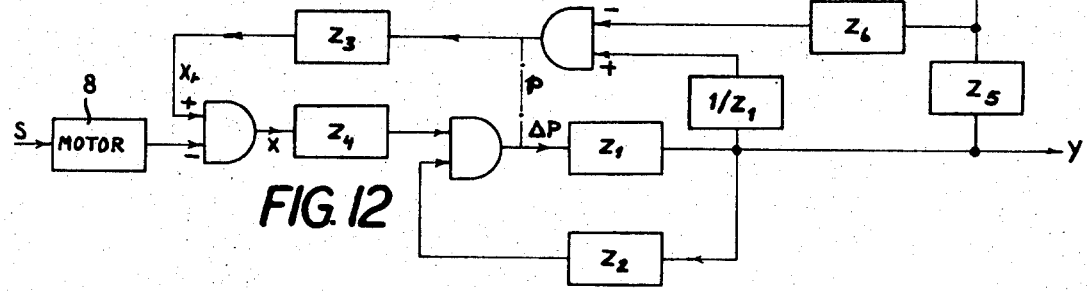
Figure 13:
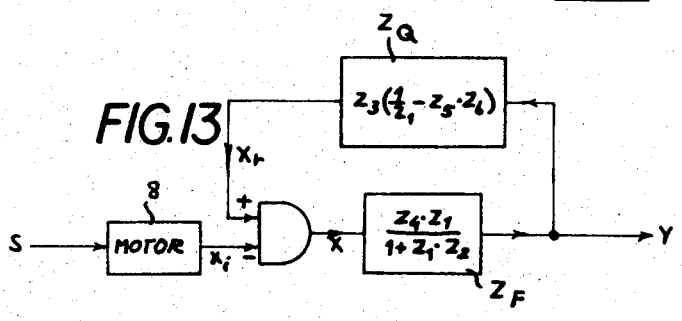

By introducing the virtual impedance $1/Z_1$ as in FIG. 9, we arrive at the block diagram of FIG. 12 which in turn may be simplified as shown in FIG. 13. The latter diagram is analogous to that of FIG. 10 and contains only the forward impedance $Z_F$ and a reverse impedance $Z_Q$. $Z_F$ has the same value as before, equation (1), whereas $$Z_Q = Z_3 \left( \frac{1}{Z_1} - Z_5 Z_6 \right) \tag{7}$$

By proceeding in the same manner as above, we find that $$\frac{y}{x_i} = \frac{Z_4 Z_1}{1 + Z_1 Z_2 - Z_4 Z_3 (1 - Z_1 Z_5 Z_6)} \tag{8}$$

If the condition of equation (5) is satisfied, we can write $$\frac{x_i}{y} = \frac{K_2 + K_5 K_6}{K_4} \tag{9}$$

where $K_5$ and $K_6$ are the constant magnitudes of $K_5$ and $K_6$, respectively.

Figure 5:
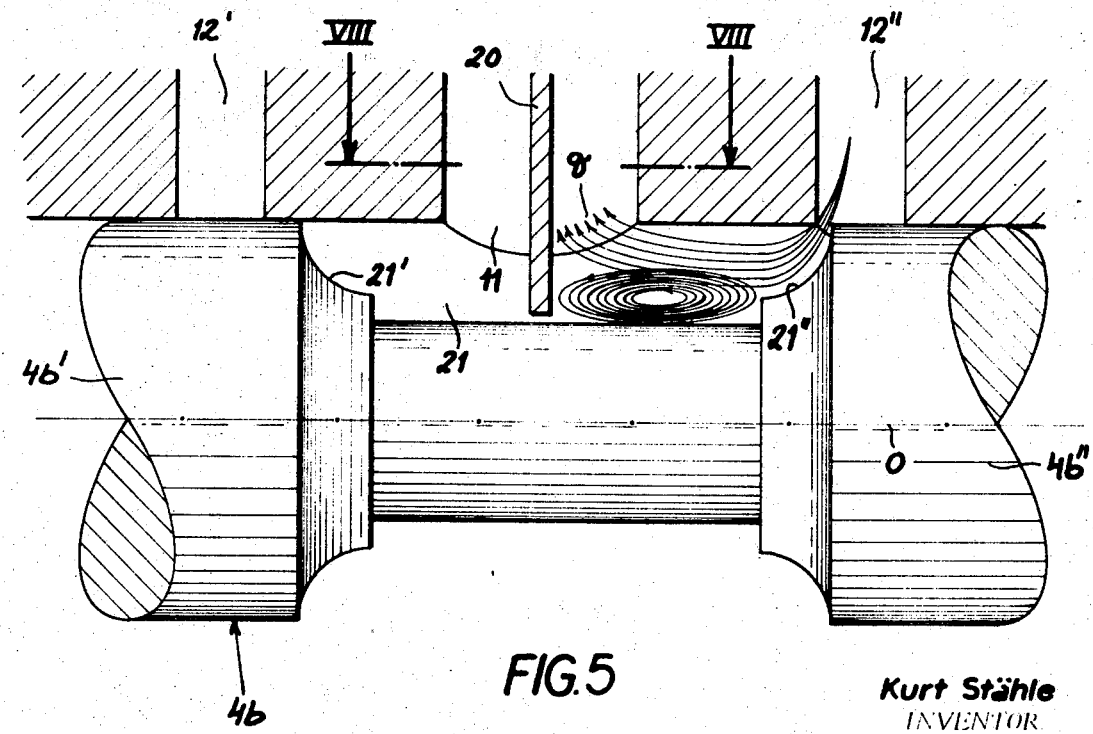
FIG. 5 is an enlarged detail view of a piston and associated elements in the system of FIG. 1 or 2.

In FIG. 5 I have shown a way of deriving from the controlled flow $q$ an axial thrust in the direction of the displacement of a piston $4b$ by the aforedescribed pressure differential $\Delta P$, thus in a sense tending to reduce this pressure differential so as to supply the negative feedback referred to in connection with FIGS. 11—13.

A peripheral recess 21 of piston $4b$, separating the lands $4b'$ and $4b''$ thereof, is shown subdivided by a stationary baffle plate 20 extending midway within the discharge port 11. The edges of recess 21 are flared at $21'$, $21''$ to convert a radial influx of fluid $q$ from entrance port $12'$ or $12''$ into an axial flow which, upon impinging on plate 20, is diverted into discharge port 11 without striking the opposite edge of the recess; thus a thrust is imparted to piston $4b$ which, in the illustrated position partly unblocking the port $12''$, is directed toward the right so as to accelerate the shift of the piston in that direction.

As shown in FIGS. 6 and 7, piston $4b$ may have symmetrical recesses on opposite sides of its axis 0, two baffle plates $20_1$ and $20_2$ extending into these recesses through diametrically opposite cutouts in a housing portion $9b$ forming the cylinder bore of the piston. If desired, further baffle plates can be introduced through additional cutouts 22 at locations offset by $90°$ from the deflectors $20_1$ and $20_2$. As shown in FIG. 8, the discharge port $11_1$ of housing 9 may be of rectangular cross section with a pair of confronting recesses to accommodate the baffle plate 20 of FIG. 5.

Naturally, the system illustrated may be modified in its various structural details without departing from the spirit and scope of my invention as defined in the appended claims.

I claim:
1. A servovalve comprising:
   a body provided with a bore;
   a piston slidable in said bore, said body forming at opposite ends of said bore a pair of pressure chambers with respective inlets and restricted outlets, said inlets confronting each other across a narrow gap, said piston being provided with blocking means for differentially obstructing said outlets upon displacement from a centered position;
   a source of control fluid under pressure communicating with said inlets through said gap;
   a control element in said gap interposed between said inlets and selectively movable relatively thereto for differentially restricting the access of said fluid to said inlets, thereby building up a pressure differential in said chambers;
   a load coupled with said piston for operation thereby in response to said pressure differential; and
   actuating means for displacing said control element to operate said load.

2. A servovalve as defined in claim 1 wherein said blocking means comprises a pair of tapered ends on said piston projecting into said chambers, said outlets comprising channels in said body extending substantially perpendicularly to the proximal generatrices of said tapered ends.

3. A servovalve as defined in claim 1 wherein said outlets confront each other across a second gap, said blocking means comprising a throttling member in said second gap entrainable by said piston.

4. A servovalve as defined in claim 1 wherein the size and the spacing of said inlets are so dimensioned that a transmission factor $Z_4$, representing the effect of an incremental displacement of said control element upon said pressure differential, is substantially the reciprocal of a transmission factor $Z_3$, representing the feedback effect of an incremental change in said pressure differential upon the displacement of said control element.

5. A servovalve as defined in claim 1 wherein said load includes conduit means for a controlled fluid having entrance and discharge ports terminating at said bore, said piston having a plurality of axially spaced lands for selectively obstructing said ports in different axial positions, said lands and ports being disposed to let said controlled fluid exert upon said piston an axial thrust aiding said pressure differential upon incipient movement of said piston into a flow-unblocking position.

6. A servovalve as defined in claim 5 wherein said lands are separated by a recess bridging an entrance port and a discharge port of said conduit means in said flow-unblocking position, further comprising deflecting means on said body received in said recess for intercepting an axial flow of said controlled fluid in a direction opposite that of said thrust.

7. A servovalve as defined in claim 6 wherein said ports include a central discharge port and a pair of lateral entrance ports on opposite sides of said discharge port, said deflecting means being a partition disposed centrally in said discharge port.

8. A servovalve as defined in claim 7 wherein said recess has flared extremities adjacent said entrance ports for developing said axial thrust by deviating a radial flow of said controlled fluid into said axial flow.